(12) United States Patent
Chen et al.

(10) Patent No.: US 7,844,996 B2
(45) Date of Patent: *Nov. 30, 2010

(54) METHOD AND APPARATUS FOR CONSTRUCTING AN ACCESS CONTROL MATRIX FOR A SET-TOP BOX SECURITY PROCESSOR

(75) Inventors: Xuemin Chen, San Diego, CA (US); Iue-Shuenn Chen, San Diego, CA (US); Shee-Yen Tan, Walnut, CA (US); Hongbo Zhu, San Diego, CA (US); Qiang Ye, Tustin, CA (US)

(73) Assignee: Broadcom Corporation, Irvine, CA (US)

( * ) Notice: Subject to any disclaimer, the term of this patent is extended or adjusted under 35 U.S.C. 154(b) by 1591 days.

This patent is subject to a terminal disclaimer.

(21) Appl. No.: 11/136,027

(22) Filed: May 23, 2005

(65) Prior Publication Data
US 2006/0265734 A1    Nov. 23, 2006

(51) Int. Cl.
*G06F 7/04* (2006.01)
(52) U.S. Cl. .................. 726/1; 726/2; 726/27
(58) Field of Classification Search ............ 726/2, 726/22, 26
See application file for complete search history.

(56) References Cited

U.S. PATENT DOCUMENTS

| | | | |
|---|---|---|---|
| 6,028,937 A * | 2/2000 | Tatebayashi et al. | 713/169 |
| 6,038,563 A * | 3/2000 | Bapat et al. | 707/10 |
| 6,850,252 B1 * | 2/2005 | Hoffberg | 715/716 |
| 6,948,183 B1 * | 9/2005 | Peterka | 725/25 |
| 2004/0088558 A1 * | 5/2004 | Candelore | 713/193 |

OTHER PUBLICATIONS

Federal Information Processing Standards Publication, Fips Pub 46-3, *Data Encryption Standard (DES)*, Oct. 25, 1999.

* cited by examiner

*Primary Examiner*—Pramila Parthasarathy
(74) *Attorney, Agent, or Firm*—McAndrews, Held & Malloy, Ltd.

(57) ABSTRACT

In multimedia systems requiring secure access, a method and apparatus for constructing an access control matrix for a set-top box security processor are provided. A security processor may comprise multiple security components and may support multiple user modes. For each user mode supported, at least one access rule table may be generated to indicate access rules to a security component in the security processor. An access control list comprises information regarding the access rules for a particular user mode to the security components in the security processor. An access control matrix may be generated based on the access control lists for the user modes supported by the security component. The access control matrix may be implemented and/or stored in the security processor for verifying access rights of a user mode.

20 Claims, 9 Drawing Sheets

METHOD AND APPARATUS FOR CONSTRUCTING AN ACCESS CONTROL MATRIX FOR A SET-TOP BOX SECURITY PROCESSOR

CROSS-REFERENCE TO RELATED APPLICATIONS/INCORPORATION BY REFERENCE

This application makes reference to U.S. patent application Ser. No. 11/136,175 filed May 23, 2005.

The above stated application is hereby incorporated herein by reference in its entirety.

FIELD OF THE INVENTION

Certain embodiments of the invention relate to accessing secure communication systems. More specifically, certain embodiments of the invention relate to a method and apparatus for constructing an access control matrix for a set-top box security processor.

BACKGROUND OF THE INVENTION

In multimedia systems that may be accessed by many different users, creating a secure access control management mechanism may be necessary in order to define and administer the access rights or privileges of the different users. An example of such a multimedia system may be a set-top box where manufacturers, vendors, operators, and/or home users may have an interest in accessing at least some limited functionality of the system. In some instances, a single device, such as a security processor for example, may be utilized to administer access control to a multimedia system. The security processor may operate independently of other components in the multimedia system when determining access rights or privileges of different users to various features in the multimedia system. For example, vendors may have limited access to some of the functions that may be accessible by the manufacturer. Home users may only have access to a subset of the vendors' access rights.

In some instances, secure access control may be managed based on an access control matrix that may be generated as part of the multimedia system design to specify access conditions of each security component supported by the system. Table 1 illustrates an access control matrix implemented as a two-dimensional array that comprises the set of rights, R(i,j), that provide the system with the appropriate commands for a particular user i to access a particular security component (SC) j. For example, user 1 may have an R(1,2) access right to security component SC 2, while user i may have an R(i,j) access right to security component SC j.

TABLE 1

Access control matrix in a two-dimensional array.

|         | SC 1   | SC 2   | ... | SC j   | ... |
|---------|--------|--------|-----|--------|-----|
| user 1  | R(1, 1)| R(1, 2)| ... | R(1, j)| ... |
| user 2  | R(2, 1)| R(2, 2)| ... | ...    | ... |
| ...     | ...    | ...    | ... | ...    | ... |
| user i  | R(i, 1)| ...    | ... | R(i, j)| ... |
| ...     | ...    | ...    | ... | ...    | ... |

However, there may be several limitations with such a straightforward implementation. On a typical security system, the number of user modes and security components may be sufficiently large that the size of the access control matrix may require large amounts of memory. There may be a significant number of entries in the access control matrix that may correspond to instances when access rights may not be granted and/or instances when the access rights may be the same for multiple user modes and/or for multiple security components, such as default settings, for example. Moreover, the addition or removal of user modes or security components may require careful implementation of additional hardware and/or software complexity in order to manage the access control matrix without introducing security concerns that may result from the additional complexity.

Specifying access conditions in a manner that overcomes at least some of the limitations presented by an access control matrix implemented as a two-dimensional array may result in more versatile secure access control management mechanism for multimedia systems.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

An apparatus and/or method for constructing an access control matrix for a set-top box security processor, substantially as shown in and/or described in connection with at least one of the drawings, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and apparatus for constructing an access control matrix for a set-top box security processor. A security processor may comprise multiple security components and may support multiple user modes. For each user mode supported, at least one access rule table may be generated to indicate access rules for a security component in the security processor. An access control list comprises information regarding the access rules for a particular user mode to the security components in the security processor. An access control matrix may be generated based on the access control lists for the user modes supported by the security component. The access control matrix may be implemented and/or stored in the security processor for verifying access rights of a user mode.

Figure 1:
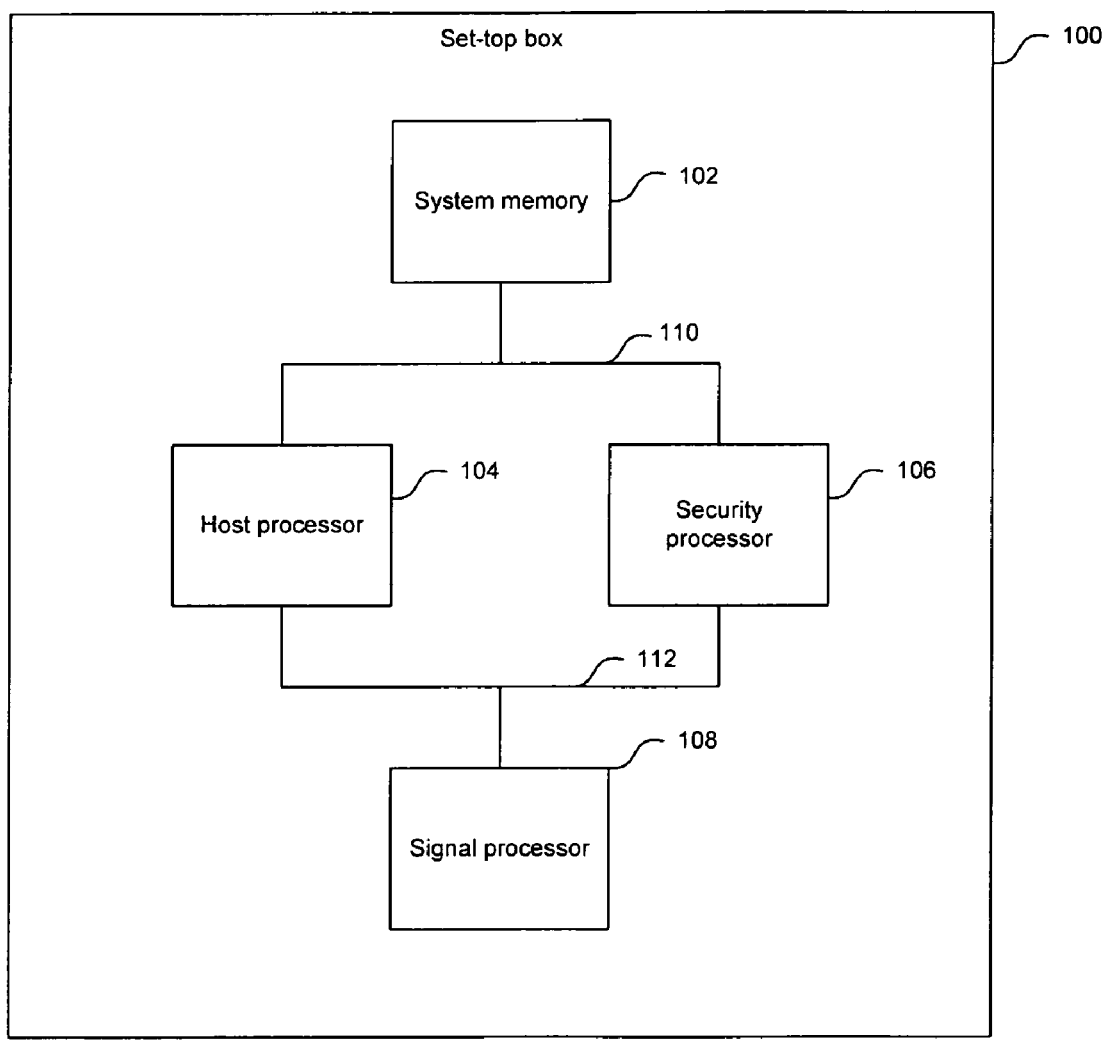
FIG. 1 is a block diagram illustrating an exemplary set-top box with a security processor, in accordance with an embodiment of the invention.

FIG. 1 is a block diagram illustrating an exemplary set-top box with a security processor, in accordance with an embodiment of the invention. Referring to FIG. 1, there is shown a set-top box 100 that may comprise a host processor 104, a system memory 102, a security processor 106, a signal processor 108, a memory bus 110, and a data bus 112. The host processor 104 may comprise suitable logic, circuitry, and/or code that may be adapted to perform data processing and/or system control operations associated with the set-top box 100. The host processor 104 may be adapted to communicate with the system memory 102 via, for example, the memory bus 110 and with the security processor 106 and/or the signal processor 108 via, for example, the data bus 112. The system memory 102 may comprise suitable logic, circuitry, and/or code that may be adapted to store data, control information, and/or operational information. The security processor 106 may comprise suitable logic, circuitry, and/or code that may be adapted to perform multiple security operations on data received by the set-top box 100. The security operations may include, but need not be limited to, non-volatile memory (NVM) security, key ladders, challenge-response authentication, memory data signature verification, secure scrambler configuration, and security assurance logic, for example. In this regard, the security processor 106 may comprise multiple security components to perform the features associated with the security operations. The signal processor 108 may comprise suitable logic, circuitry, and/or code that may be adapted to perform a plurality of processing operations on the data received by the set-top box 100. The set-top box may utilize at least one signal processor 108.

In operation, the security processor 106 may receive access requests from a user to perform a certain data operations within the set-top box 100. The security processor 106 may verify access rights or privileges that the user may have to a security component in the security processor 106 based on an access control matrix. The security processor 106 may determine whether access to a security component is provided independently of the host processor 104, that is, the security processor 106 may not operate as a slave to the host processor 104. When access to the security component is verified, the security processor 106 may perform the security feature or features associated with the security component. In some instances, the security processor 106 may transfer the results of the operations associated with the security component to, for example, the host processor 104 and/or the signal processor 108. Moreover, the security processor 106 may utilize information stored in the system memory 102 when performing certain security operations associated with security features.

Figure 2:
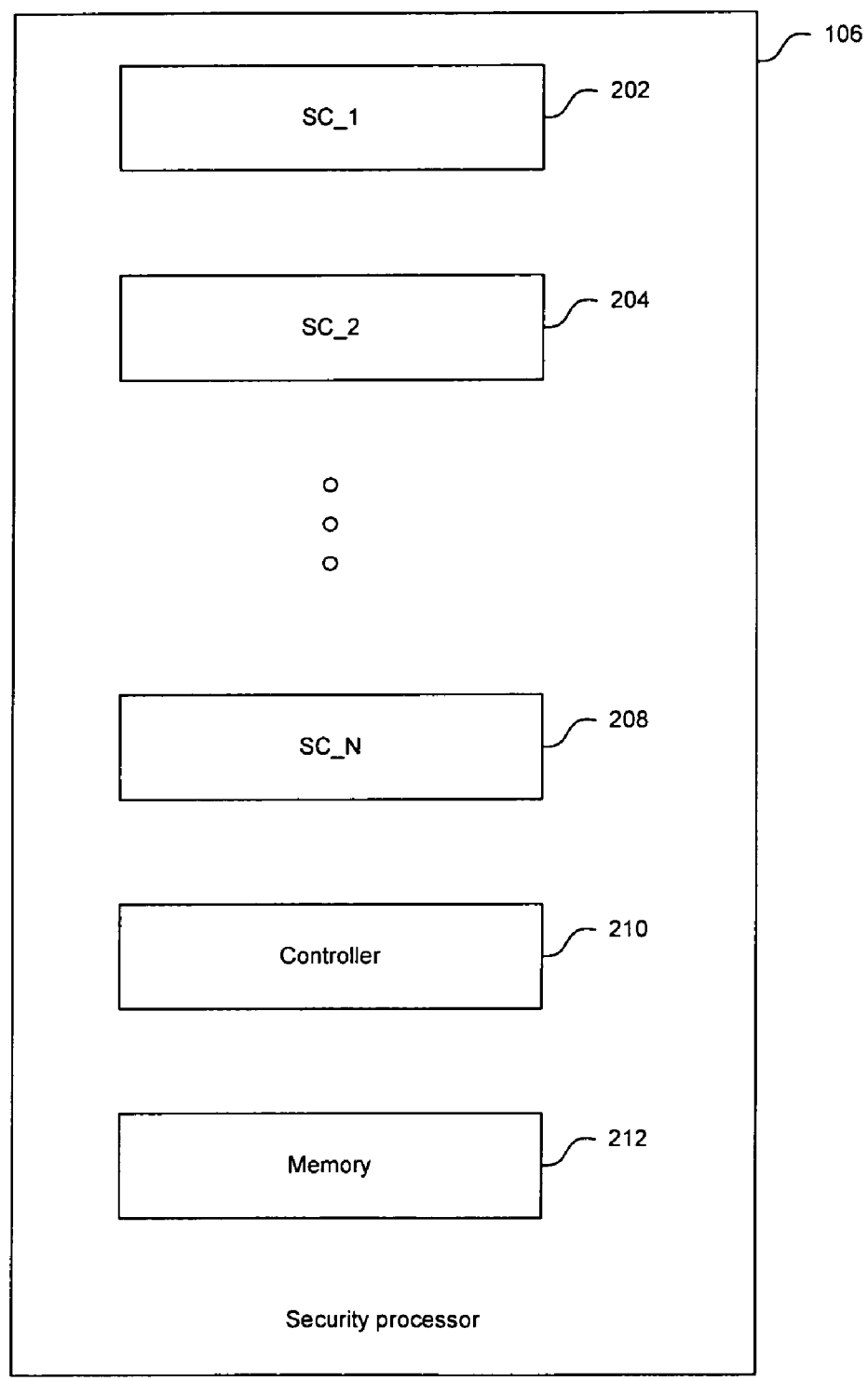
FIG. 2 is a block diagram illustrating an exemplary security processor with at least one security component and a processor controller, in accordance with an embodiment of the invention.

FIG. 2 is a block diagram illustrating an exemplary security processor with at least one security component and a processor controller, in accordance with an embodiment of the invention. Referring to FIG. 2, the security processor 106 in FIG. 1 may comprise security components SC_1 202 through SC_N 208, a controller 210, and an internal memory 212. The security components SC_1 202 through SC_N 208 may each comprise suitable logic, circuitry, and/or code that may be adapted to perform certain security features. In some instances, a portion of the access control matrix may be implemented in hardware in at least one of the security components SC_1 202 through SC_N 208. The controller 210 may comprise suitable logic, circuitry, and/or code that may be adapted to control the operations of the security processor 106. The internal memory 212 may comprise suitable logic, circuitry, and/or code that may be adapted to store data, control information, and/or operational information. In this regard, at least a portion of the information associated with the access control matrix utilized by the security processor 106 may be stored in the internal memory 212. For example, portions of the access control matrix that may be renewed may be implemented using secure read only memory (ROM) or secure random access memory (RAM) while those portions that may not be renewed may be implemented in hardware.

In determining the architecture of the security processor 106, modular decomposition techniques and bottom-up design may be utilized. In the security processor 106, each of the security components SC_1 202 through SC_N 208 may be implemented as a separate security feature. Security features that may be implemented in a security component may comprise, but need not be limited to, non-volatile memory (NVM) security, key ladders, challenge-response authentication, memory data signature verification, secure scrambler configuration, and security assurance logic, for example.

An NVM security component may be adapted to allow user mode configuration, key storage and various security restrictions and operation controls, for example. A key ladder security component may be utilized as a key protection mechanism by utilizing a ladder that is formed when circulating keys through a hardware cipher accelerator that encrypts or wraps keys and then decrypts or unwraps keys, for example. The encrypted or decrypted keys may be transferred to, for example, a network descrambler, a personal video recorder (PVR) scrambler, or a scrambler for output content protection as may be restricted by the access control policy or rules in the security processor 106.

A challenge-response authentication security component may be adapted to implement pass algorithms, that is, algorithms where a secret function may be utilized to provide access, for example. The challenge-response authentication security component may also be adapted to implement one-time signed password schemes. A memory data signature verification security component may be adapted to ensure that software is from a reliable or acceptable source, for example. A secure scrambler security component may be adapted to ensure that operation modes associated with a user are protected, for example. Moreover, a security assurance security component may be adapted to protect against system security attacks, for example.

For a given user mode, the operations of the security components SC_1 202 through SC_N 208 of the security processor 106 may be driven or set up by a set of command sequences. The security processor 106 may be implemented as a strong-noninterference secure system. These operations may be deterministic and the operations of one security component may not interfere with the operations of a different security component. In other words, the command sequence associated with one security component may not generate results for a different security component.

The access control matrix for the security processor 106 may be implemented as a set of access control lists that enforce rules for each security component. In this regard, the security processor 106 may use rule-based access controls. In a rule-based access control system, a system mechanism controls access to a security component and an individual user may not alter or modify such access.

An access control list ACL(j) may be defined as a set of pairs that may be denoted as follows:

$$\left\{(i, R(i, j)) : i \in U, R(i, j) \subseteq \bigcup_i R(i, j)\right\}.$$

The set of pairs for the ACL(j) may be associated with a particular security component j∈Sc, where U is a set of users or user modes and SC is a set of security components and $\bigcup_i R(i,j)$ is a set of rights or privileges associate with the security component j. An access control ACL(j) may represent the access that a user mode i may have to a particular security component j using an access right or privilege in R(i,j).

A capability list CAP(i) may be defined as a set pairs that may be denoted as follows:

$$\left\{(i, R(i, j)) : j \in SC, R(i, j) \subseteq \bigcup_j R(i, j)\right\}.$$

The set of pairs for the CAP(i) may be associated with a particular user or user mode i∈U, where $$\bigcup_j R(i, j)$$

is a set of rights for the user mode i. A capability list CAP(i) may represent the particular user mode i that may access a security component j using an access right or privilege in R(i,j). Whether using an access control list or a capability list, for a user mode i, a right or privilege provided by R(i,j) may be specified as a set of parameters and/or rules for accessing the security component j. When using access control lists to generate an access control matrix, an access control list may be specified for each security component in each user mode supported by the security processor 106.

Figure 3:
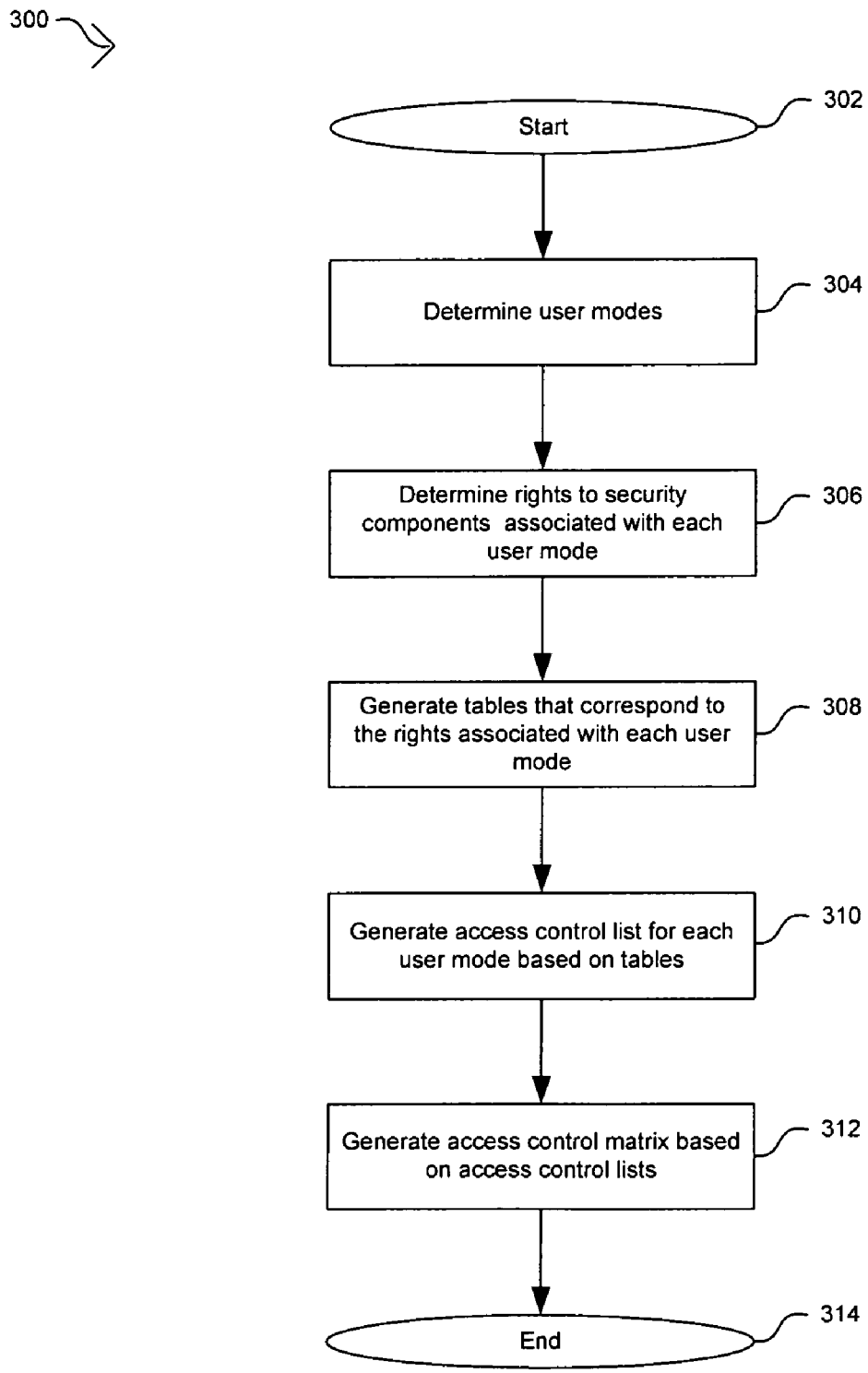
FIG. 3 is a flow diagram illustrating exemplary steps for generating an access control matrix for a security processor, in accordance with an embodiment of the invention.

FIG. 3 is a flow diagram illustrating exemplary steps for generating an access control matrix for a security processor, in accordance with an embodiment of the invention. Referring to FIG. 3, after start step 302, in step 304, the user modes that may be supported by the security processor 106 may be determined. In step 306, the rights or privileges associated with the user modes may be determined. In step 308, a set of tables may be generated, where the tables may comprise access rules that may implement the rights or privileges determined in step 306. In step 310, an access control list may be generated for each security component based on the tables generated in step 308. In step 312, combining the access control lists for the security components supported by the security processor 106 may generate an access control matrix. After step 312, the flow chart 300 may proceed to end step 314.

Figure 4A:
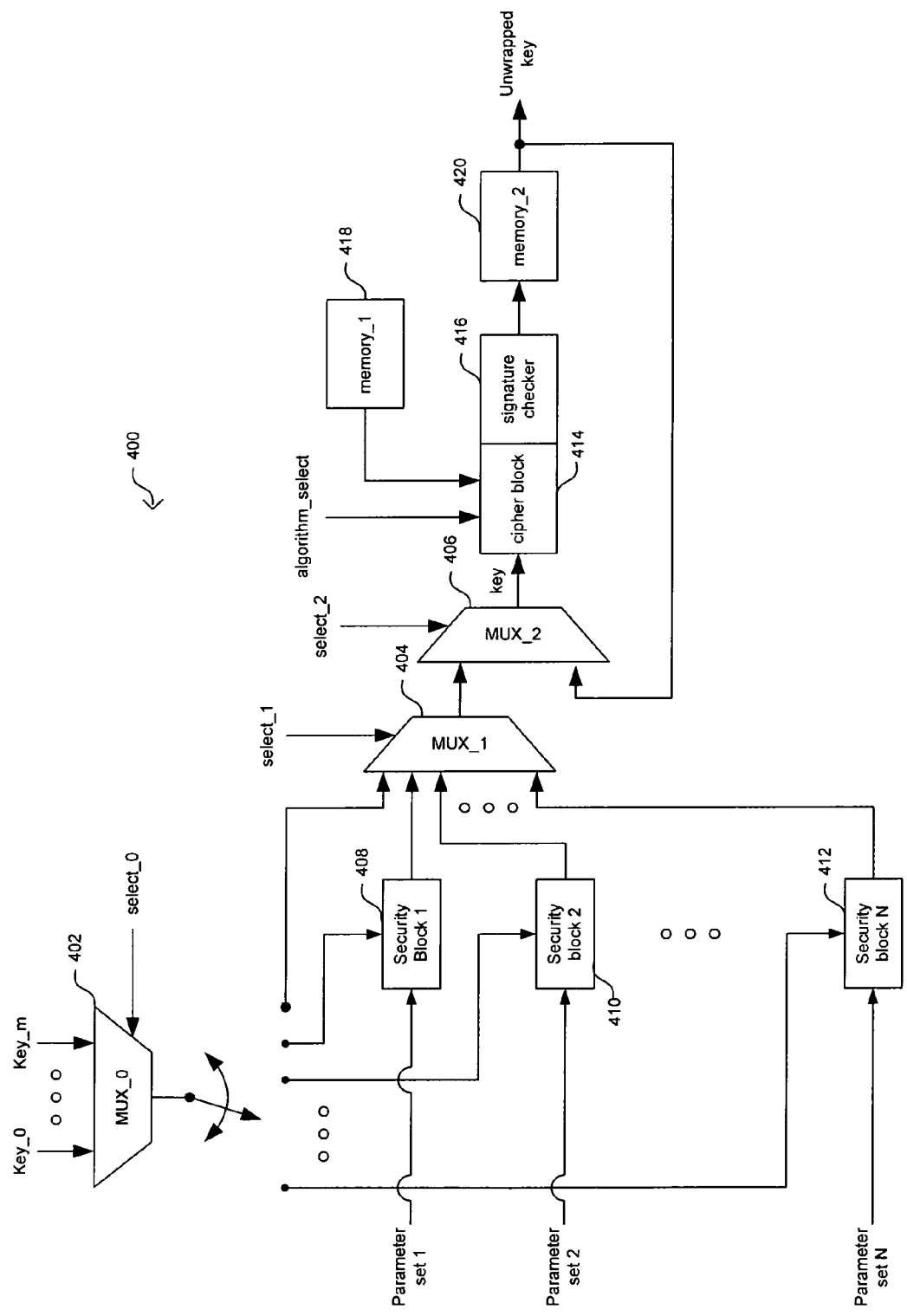
FIG. 4A is a block diagram illustrating an exemplary key ladder security component, in accordance with an embodiment of the invention.

FIG. 4A is a block diagram illustrating an exemplary key ladder security component, in accordance with an embodiment of the invention. Referring to FIG. 4A, there is shown a key ladder system 400 that may be implemented in a key ladder security component for providing keys to network descramblers for removing network encryption on incoming transport streams. The types of network descramblers may include, but need not be limited to, advanced encryption standard 128 (AES-128), data encryption standard (DES), digital video broadcasting (DVB), and Multi2.

The key ladder system 400 may comprise a first multiplexer (MUX_0) 402, a second multiplexer (MUX_1) 404, a third multiplexer (MUX_2) 406, security_block_1 408 through security_block_N 412, a cipher block 414, a signature checker 416, a first memory (memory_1) 418, and a second memory (memory_2) 420.

The MUX_0 402 may comprise suitable logic, circuitry, and/or code that may be adapted to select a key from the input keys key_0 through key_m. A selection signal, select_0, may be utilized to select the key. The output of the MUX_0 402 may be transferred to at least one of the security_block_1 408 through security_block_N 412 and/or to the MUX_1 404. The security_block_1 408 through security_block_N 412 may each comprise suitable logic, circuitry, and/or code that may be adapted to be receive a parameter set and may be utilized as user specific key protection blocks. For example, the security_block_1 408 may receive parameter set 1 while security_block_N 412 may receive parameter set N. The output of each of the security_block_1 408 through security_block_N 412 may be transferred to the MUX_1 404 for selection.

The MUX_1 404 may comprise suitable logic, circuitry, and/or code and may be adapted to select a key from the MUX_0 402 or from the security_block_1 408 through security_block_N 412. A selection signal, select_1, may be utilized to select from one of the inputs to the MUX_1 404. The MUX_2 406 may comprise suitable logic, circuitry, and/or code that may be adapted to select the output of the MUX_1 404 or the output of the memory_2 420. In this regard, the MUX_2 406 may be utilized in the key ladder operation to enable the feedback that allows a key, which has been previously encrypted or decrypted, to be encrypted or decrypted again.

The cipher block 414 may comprise suitable logic, circuitry, and/or code that may be adapted to encrypt or decrypt an input key from the MUX_2 406 by utilizing an encrypted and signed key from the memory_1 418. The cipher block 414 may support, but need not be limited to, the ciphering algorithms triple DES (3DES), AES-128, 3DES with signature checking, and AES-128 with signature checking. A selection signal, algorithm_select, may be utilized to select the ciphering algorithm for encryption or decryption. The signature checker 416 may comprise suitable logic, circuitry, and/or code that may be adapted to verify the signature when utilizing, for example, the 3DES with signature checking or AES-128 with signature checking. The memory_2 420 may comprise suitable logic, circuitry, and/or code that may be adapted to store the output of the signature checker 416. When the signature checker 510 is not enabled or is not utilized, the memory_2 420 may store the response from the cipher block 414.

TABLE 2

Key map.

| Parameter set 1 | Parameter set 2 | ... | Parameter set N | key entry |
|---|---|---|---|---|
| 0~m | 0~n | ... | 0~p | Key_0 |
| ... | ... | ... | ... | ... |
| 0~m | 0~n | ... | 0~p | Key_m |
| ... | ... | ... | ... | ... |

For the user mode illustrated in FIG. 4A, for example, a set of tables may be utilized to determine or define the rights or privileges for the access control list. For example, Table 2 may illustrate a key assignment map for the key ladder system 400. In Table 2, the parameters sets need not be of the same size. For example, parameter set 1 may range from 0 to m while parameter set N may range from 0 to p. In each case, the parameter set is associated with a key entry from the MUX_0 402. Table 3 may illustrate access control rules for the operation of the key ladder system 400 and Table 4 may illustrate memory routing addresses for the output of each level of the key ladder system 400.

TABLE 3

Specifications of operation of the key ladder.

| select_0 | select_1 | Select_2 | algorithm_select | memory_2 address |
|---|---|---|---|---|
| 0~N | 0~N | 0~1 | 0~3 | Addr0~Addr2 |
| ... | ... | ... | ... | ... |
| 0~N | 0~N | 0~1 | 0~3 | ... |
| ... | ... | ... | ... | ... |

TABLE 4

Output key routing table.

| memory_2 address | Destination |
|---|---|
| Addr0 | Scrambler or descrambler key table |
| Addr1 | ... |
| Addr2 | ... |
| ... | ... |

In Table 3, the select_0 and select_1 signals may select from (N+1) inputs to the MUX_0 402 and the MUX_1 404 respectively. The select_2 signal may select from two inputs to the MUX_2 406. The algorithm_select signal may select from four ciphering algorithms supported by the cipher block 414. In Table 4, the first address, Addr0, illustrates that the output of the key ladder system 400 may be transferred to a scrambler or descrambler table.

There may be multiple key ladders required as multiple user modes may utilize this security feature. In this regard, for each key ladder supported by the security processor 106 the previous set of tables, Table 2 through Table 4, may need to be specified.

Figure 4B:
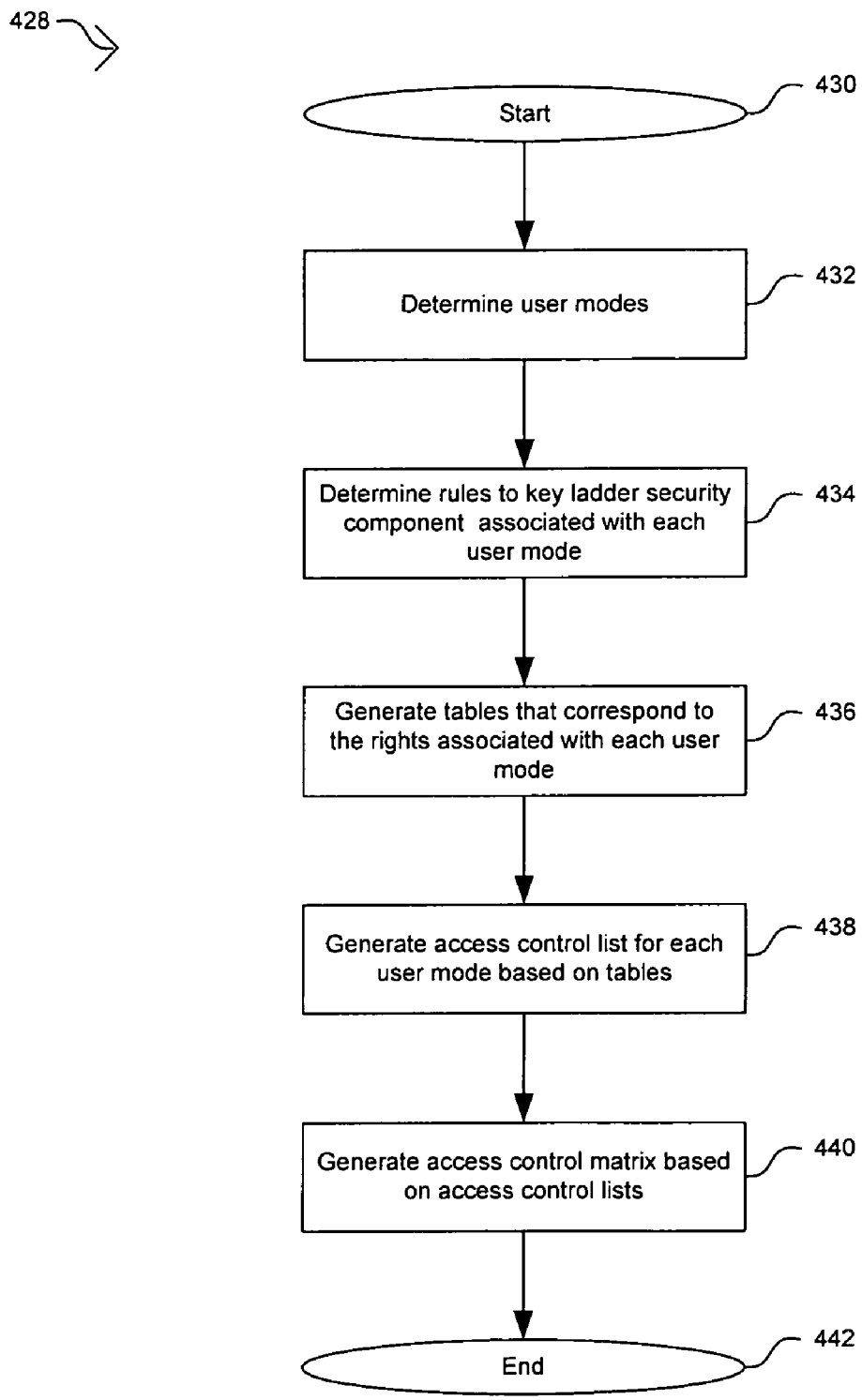
FIG. 4B is a flow diagram illustrating exemplary steps for generating an access control matrix based on an access control list for a key ladder security component, in accordance with an embodiment of the invention.

FIG. 4B is a flow diagram illustrating exemplary steps for generating an access control matrix based on an access control list for a key ladder security component, in accordance with an embodiment of the invention. Referring to FIG. 4B, after start step 430, in step 432, the user modes that may be supported by the security processor 106 may be determined. In step 434, the rights or privileges for the key ladder security component associated with the user modes may be determined. In step 436, access rule tables similar to Table 2 through Table 4 may be generated for each user mode to implement the rights or privileges determined in step 434. In step 438, an access control list may be generated for the key ladder security component based on the tables generated in step 436. In step 440, an access control matrix may be generated based on the access control list for the key ladder security component. After step 440, the flow chart 428 may proceed to end step 442.

Figure 5A:
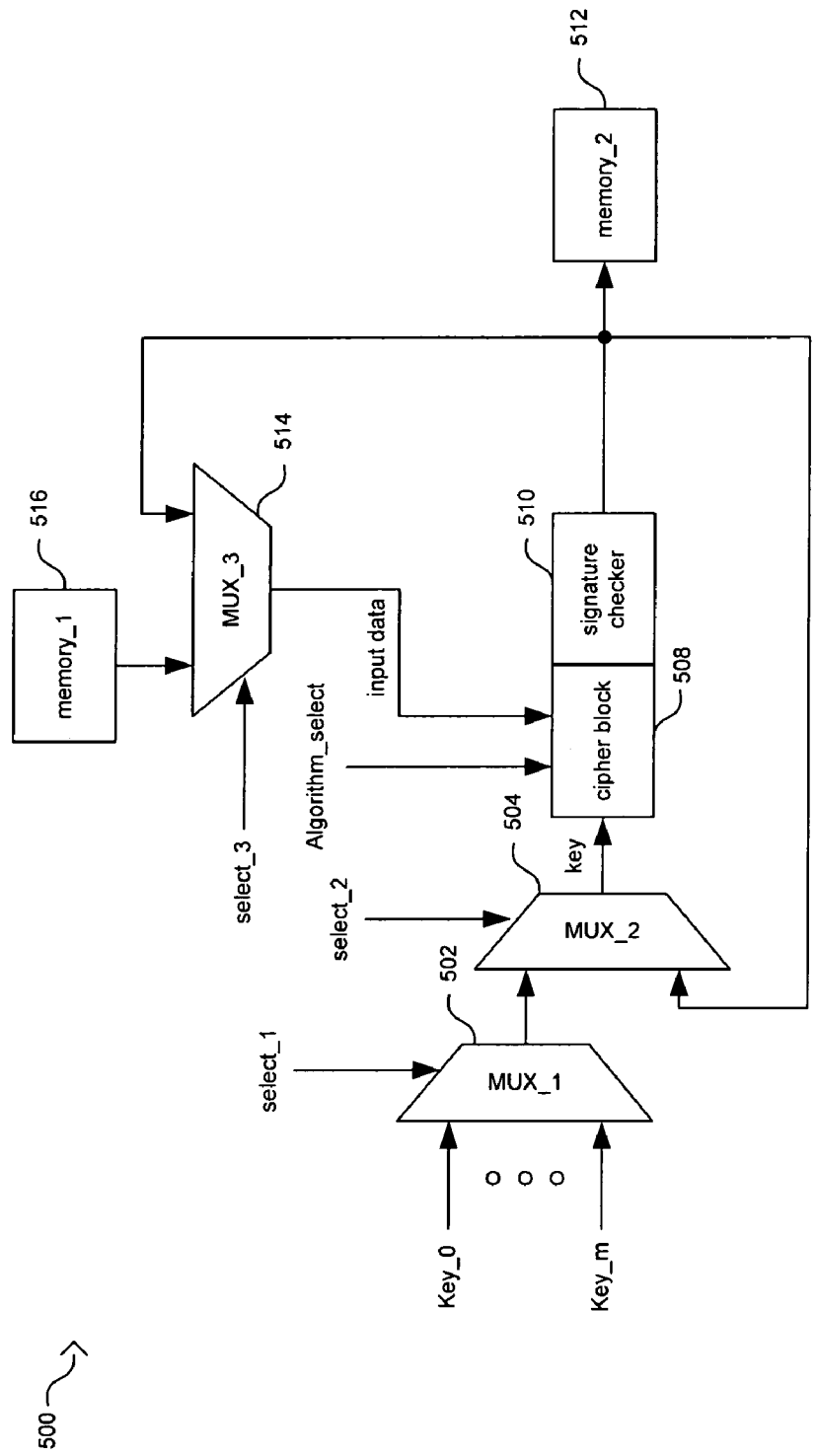
FIG. 5A is a block diagram illustrating an exemplary challenge-response security component, in accordance with an embodiment of the invention.

FIG. 5A is a block diagram illustrating an exemplary challenge-response security component, in accordance with an embodiment of the invention. Referring to FIG. 5A, there is shown a challenge-response system 500 that may comprise a first multiplexer (MUX_1) 502, a second multiplexer (MUX_2) 504, a third multiplexer (MUX_3) 506, a cipher block 508, a signature checker 510, a first memory (memory_1) 512, and a second memory (memory_2) 514.

The MUX_1 502 may comprise suitable logic, circuitry, and/or code that may be adapted to select a key from the input keys key$_0$ through key_m. A selection signal, select_1, may be utilized to select the key. The output of the MUX_1 502 may be transferred to the MUX_2 504. The MUX_2 504 may comprise suitable logic, circuitry, and/or code and may be adapted to select the output from the MUX_1 502 or from the signature checker 510. When the signature checker 510 is not enabled or is not utilized, the MUX_2 504 may receive the output of the cipher block 508. In this regard, the MUX_2 504 may be utilized to enable a feedback operation in the challenge-response system 500. The MUX_3 506 may comprise suitable logic, circuitry, and/or code that may be adapted to select from the output of the memory_1 512 or from the output of the signature checker 510. When the signature checker 510 is not enabled or is not utilized, the MUX_3 506 may receive the output of the cipher block 508.

The cipher block 508 may comprise suitable logic, circuitry, and/or code that may be adapted to encrypt or decrypt an input key from the MUX_2 504 by utilizing a response or nonce from the MUX_3 506. The cipher block 508 may support, but need not be limited to, the ciphering algorithms triple DES (3DES), AES-128, 3DES with signature checking, and AES-128 with signature checking. A selection signal, algorithm_select, may be utilized to select the ciphering algorithm for encryption or decryption. The signature checker 510 may comprise suitable logic, circuitry, and/or code that may be adapted to verify the signature when utilizing, for example, the 3DES with signature checking or AES-128 with signature checking. The memory_2 514 may comprise suitable logic, circuitry, and/or code that may be adapted to store the response from the signature checker 416. When the signature checker 510 is not enabled or is not utilized, the memory_2 514 may store the response from the cipher block 508.

The access control list for a challenge-response security component based on the challenge-response system 500 may be specified in a similar manner as described for the key ladder system 400. For example, the user mode implemented by the challenge-response system 500 may utilize a set of tables similar to Table 2 through Table 4.

Figure 5B:
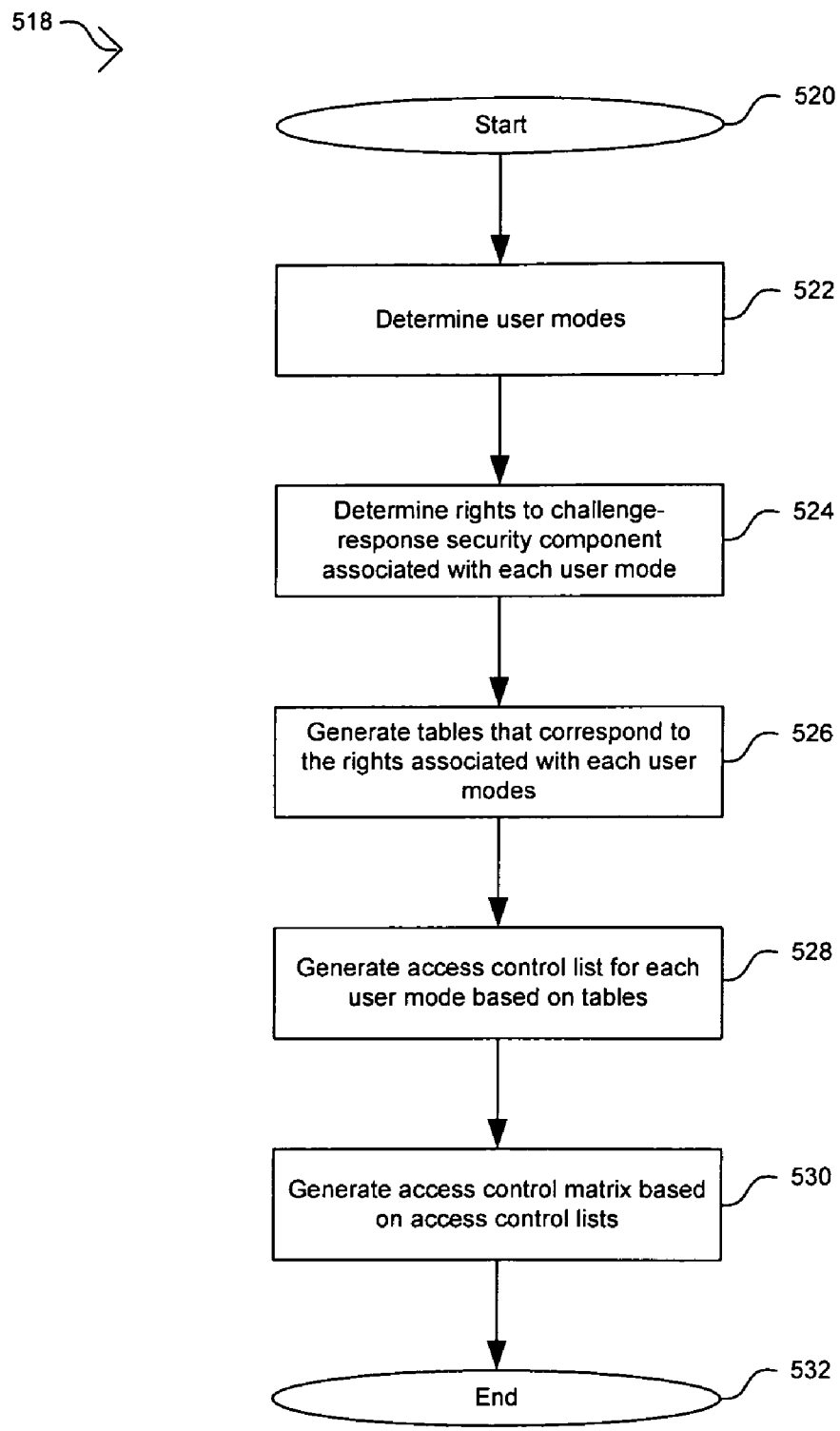
FIG. 5B is a flow diagram illustrating exemplary steps for generating an access control matrix based on an access control list for a challenge-response security component, in accordance with an embodiment of the invention.

FIG. 5B is a flow diagram illustrating exemplary steps for generating an access control matrix based on an access control list for a challenge-response security component, in accordance with an embodiment of the invention. Referring to FIG. 5B, after start step 520, in step 522, the user modes that may be supported by the security processor 106 may be determined. In step 524, the rights or privileges for the challenge-response security component associated with the user modes may be determined. In step 526, access rule tables such as Table 2 through Table 4 may be generated for each user mode to implement the rights or privileges determined in step 524. In step 528, an access control list may be generated for the challenge-response security component based on the tables generated in step 526. In step 530, an access control matrix may be generated based on the access control list for the challenge-response security component. After step 530, the flow chart 518 may proceed to end step 532.

Figure 6A:
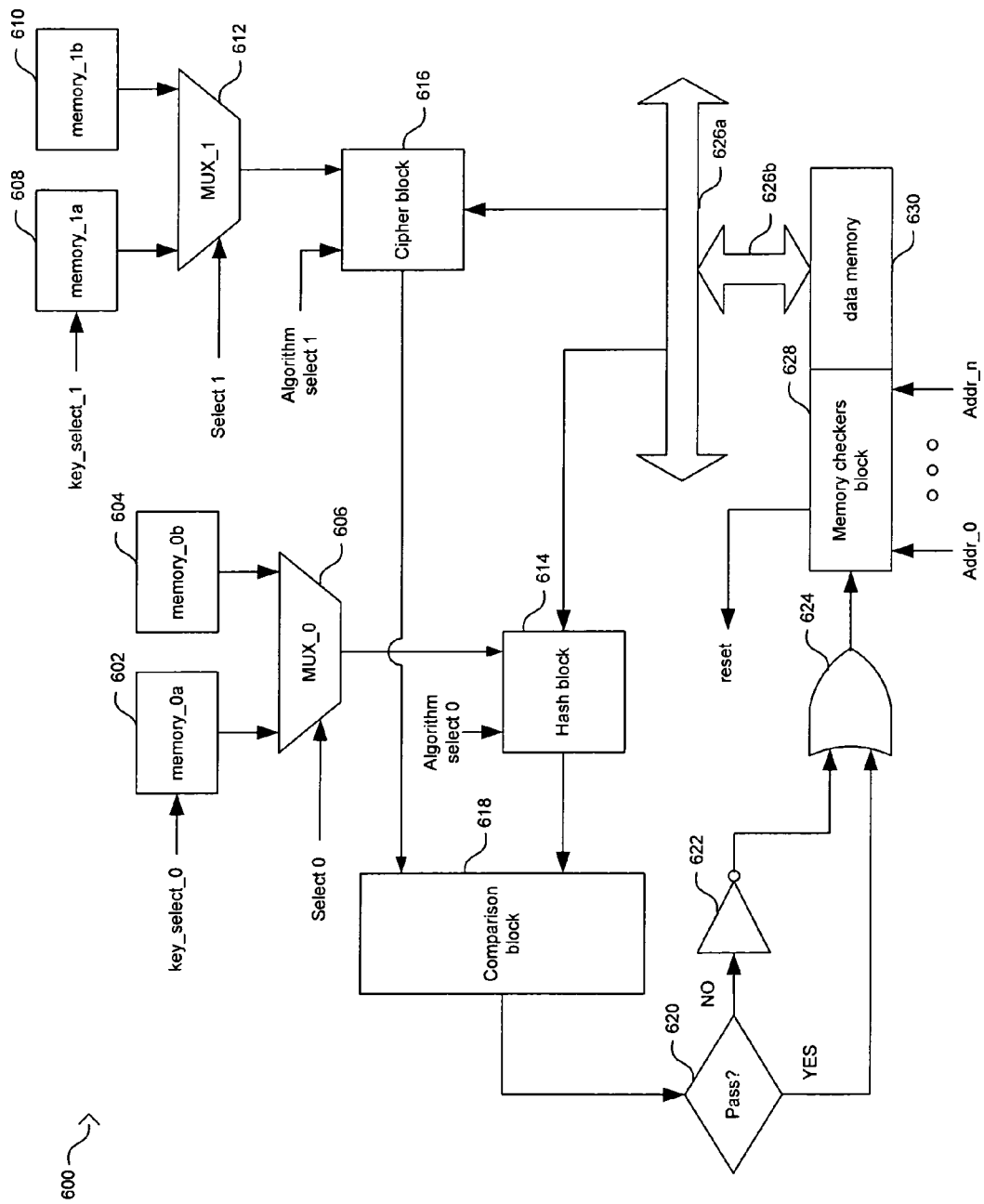
FIG. 6A is a block diagram illustrating an exemplary memory data signature verification security component, in accordance with an embodiment of the invention.

FIG. 6A is a block diagram illustrating an exemplary memory data signature verification security component, in accordance with an embodiment of the invention. Referring to FIG. 6A, there is shown a memory data signature verification system 600 that comprises a first memory (memory_0a) 602, a second memory (memory_0b) 604, a third memory (memory_1a) 608, a fourth memory (memory_1b) 610, a first multiplexer (MUX_0) 606, a second multiplexer (MUX_1) 612, a hash block 614, a cipher block 616, a comparison block 618, a decision block 620, an inverter 622, an OR gate 624, a first bus 626a, a second bus 626b, a memory checkers block 628, and a data memory 630.

The memory_0a 602 may comprise suitable logic, circuitry, and/or code that may be adapted to store multiple keys. The memory_0a 602 may be implemented utilizing a read only memory (ROM), for example. A selection signal, key_select_0, may be utilized to select a key from the memory_0a 602. The memory_0b 604 may comprise suitable logic, circuitry, and/or code that may be adapted to store software loadable keys. In this regard, the memory_0b 604 may be implemented utilizing a random access memory (RAM), for example. The MUX_0 606 may comprise suitable logic, circuitry, and/or code that may be adapted to select the output of the memory_0a 602 or the output of the memory_0b 604. A selection signal, select_0, may be utilized to make the selection. The output of the MUX_0 606 may correspond to a possible key and may be transferred to the hash block 614.

The memory_1a 608 may comprise suitable logic, circuitry, and/or code that may be adapted to store multiple keys. The memory_1a 608 may be implemented utilizing a read only memory (ROM), for example. A selection signal, key_select_1, may be utilized to select a key from the memory_1a 608. The memory_1b 610 may comprise suitable logic, circuitry, and/or code that may be adapted to store software loadable keys. In this regard, the memory_1b 610 may be implemented utilizing a random access memory (RAM), for example. The MUX_1 612 may comprise suitable logic, circuitry, and/or code that may be adapted to select the output of the memory_1a 608 or the output of the memory_1b 610. A selection signal, select_1, may be utilized to make the selection. The output of the MUX_1 612 may correspond to a key and may be transferred to the cipher block 616.

The cipher block 616 may comprise suitable logic, circuitry, and/or code that may be adapted to encrypt or decrypt the output from the MUX_1 612 by utilizing input data obtained from the data memory 630 via the first bus 626a and the second bus 626b. The cipher block 616 may support, but need not be limited to, the ciphering algorithms AES and Rivest-Shamir-Adleman (RSA). A selection signal, algorithm_select_1, may be utilized to select the ciphering algorithm for encryption or decryption. The hash block 614 may comprise suitable logic, circuitry, and/or code that may be adapted to perform a hashing algorithm on the output from the MUX_0 606 by utilizing input data obtained from the data memory 630 via the first bus 626a and the second bus 626b. A hashing algorithm is a mathematical operation that converts an arbitrary length input into a fixed length output. The hash block 614 may support, but need not be limited to, the secure hashing algorithm (SHA1). A selection signal, algorithm_select_0, may be utilized to select the hashing algorithm.

The compare block 618 may comprise suitable logic, circuitry, and/or code that may be adapted to compare the output of the hash block 614 and the output of the cipher block 616. When the outputs are the same, the operation of the compare block 618 may generate a pass signal. When the outputs are not the same, the operation of the compare block 618 may generate a fail signal. The decision block 620 may comprise suitable logic, circuitry, and/or code that may be adapted to determine whether a pass signal was generated by the compare block 620. When a pass signal is detected, the decision block 620 may generate a YES signal that may be transferred to the OR gate 624. When the pass signal is not detected, the decision block 620 may generate a NO signal that may be transferred to the OR gate 624 via the inverter 622. The output of the OR gate 624 may be utilized to enable or disable the memory checkers block 628. The memory checkers block 628 may comprise suitable logic, circuitry, and/or code that may be adapted to determine whether an illegal memory access has been attempted. When an illegal memory access has been attempted, the memory checkers block 628 may generate a reset signal to indicate the illegal memory access.

For the user mode illustrated in FIG. 6A, for example, Table 5 may be utilized to determine or define the rights or privileges for the access control list. In Table 5, RAM0 may correspond to a RAM implementation of the memory_0b 604 and RAM1 may correspond to a RAM implementation of the memory_1b 610. In this regard, RAM0 and RAM1 may comprise predetermined addresses, for example. The keys in the RAM0 and RAM1 may be unwrapped, for example, by a key ladder security component.

TABLE 5

Access table for memory data signature verification.

| Select 0 | Select 1 | Key select 0 | Key select 1 | RAM0 key | RAM1 key | Alg. select 0 | Alg. Select 1 | Memory type and address |
|---|---|---|---|---|---|---|---|---|
| 0~1 | 0~1 | 0~p | 0~q | Allow or not | Allow or not | 0~m | 0~n | Data and signature address range |
| ... | ... | ... | ... | ... | ... | ... | ... | ... |
| ... | ... | ... | ... | ... | ... | ... | ... | ... |

Figure 6B:
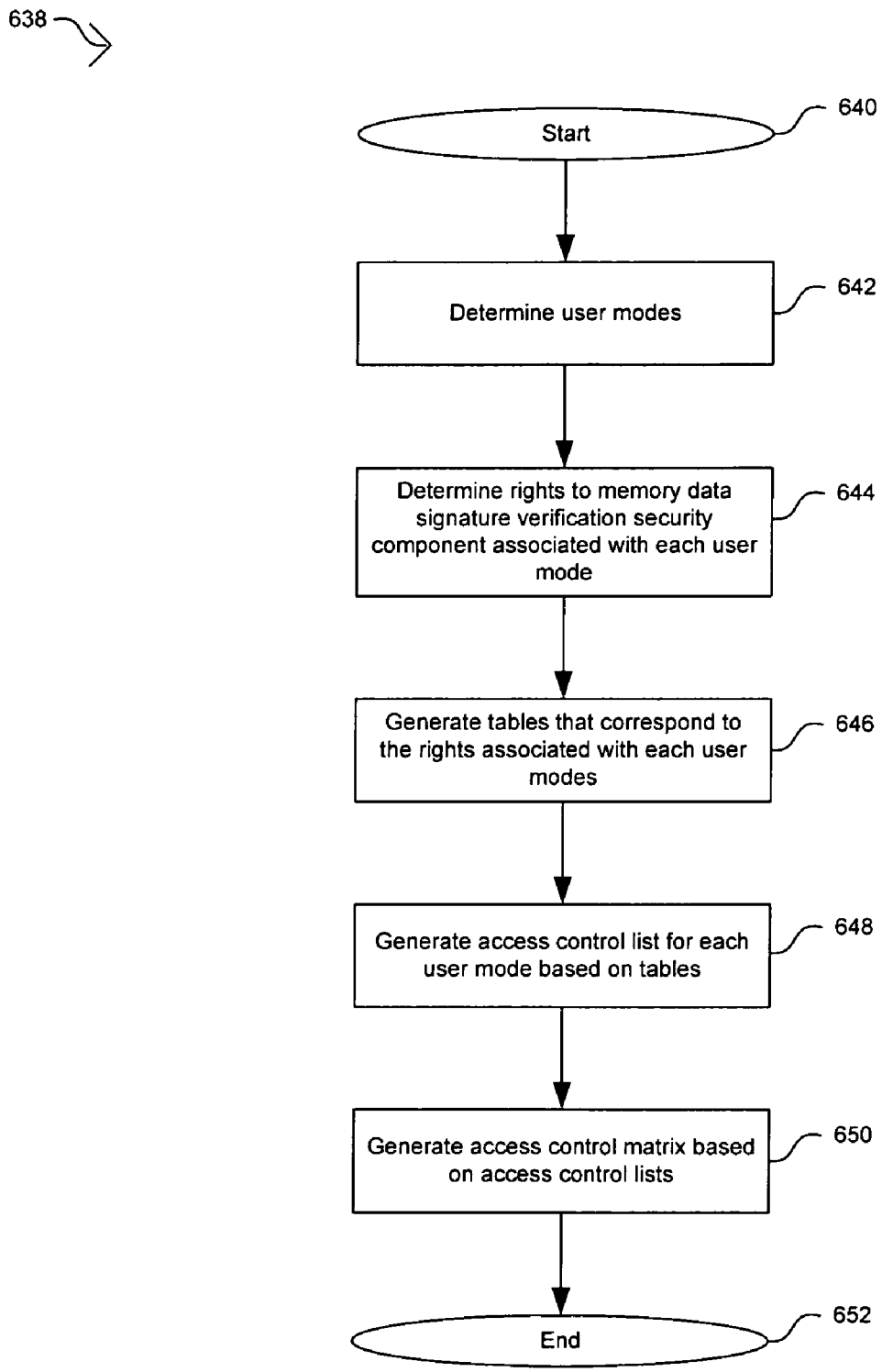
FIG. 6B is a flow diagram illustrating exemplary steps for generating an access control matrix based on an access con-

FIG. 6B is a flow diagram illustrating exemplary steps for generating an access control matrix based on an access control list for a memory data signature verification security component, in accordance with an embodiment of the invention. Referring to FIG. 6B, after start step 640, in step 642, the user modes that may be supported by the security processor 106 may be determined. In step 644, the rights or privileges for the memory data signature verification security component associated with the user modes may be determined. In step 646, access rule tables such as Table 5 may be generated for each user mode to implement the rights or privileges determined in step 644. In step 648, an access control list may be generated for the memory data signature verification security component based on the table generated in step 646. In step 650, an access control matrix may be generated based on the access control list for the memory data signature verification security component. After step 650, the flow chart 638 may proceed to end step 652.

TABLE 6

Scrambler configuration table.

| Hardware module | Scrambler | Operation module | Initialization/ Termination | Disable |
|---|---|---|---|---|
| Conditional access | DES | ECB | Termination block processing, short clear data block | Yes or No |
| Conditional access | DES | CBC | IV, Termination block processing, short clear data block | ... |
| ... | ... | ... | ... | ... |
| PVR copy protection | 3DES-ABC | ECB | Short clear data block | ... |
| ... | ... | ... | ... | ... |
| Interface protection | DES | ECB | Short clear data block | ... |
| ... | ... | ... | ... | |
| HDMI | HDCP | N/A | N/A | ... |
| Memory | SDRAM scrambler | N/A | N/A | ... |

Other security components, including but not limited to, secure scrambler security components, security assurance security components, or secure non-volatile memory (NVM) security components may be implemented following a similar approach as described herein. The secure scrambler security component and the security assurance security component, for example, may be implemented via secure NVM operation control bits.

Table 6 illustrates an example of specifying scramblers associated with hardware modules in a set-top box such that proper security levels may be ensured for the user. In this regard, Table 6 may specify whether a scrambler may be disabled or enabled for a particular hardware module in a set-top box. Table 6 illustrates various scramblers, such as DES scrambler for conditional access and interface protection, a DES-ABC scrambler for PVR copy protection, a high-bandwidth digital content protection (HDCP) scrambler for high-definition multimedia interfaces (HDMI), or a synchronous DRAM (SDRAM) scrambler for memory protection. The DES scrambler may be operated in either an electronic codebook (ECB) mode or cipher block chaining (CBC) mode, for example. Other types of scramblers may also be utilized for the secure scrambler security component.

In another embodiment of the security processor 106, the access control matrix may be generated based on capacity lists. Capacity lists may be generated based on rights or privileges indicated in tables in a similar manner as illustrated for access control lists.

Specifying access conditions based on access control lists or capacity lists may overcome at least some of the limitations presented by an access control matrix implemented as a two-dimensional array and may result in more versatile secure access control management mechanism for multimedia systems.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, the method comprising:
   determining a plurality of user modes supported by a security processor, the security processor comprising a plurality of security components;
   determining a plurality of rights or privileges for the plurality of security components;
   generating a respective set of access rule tables for each combination of a particular security component and a particular user mode based on the determined plurality of rights or privileges; and
   generating a respective access control list for each corresponding security component based on said generated sets of access rule tables associated with the corresponding security component, wherein the plurality of security components comprises a key ladder security component, and wherein the generated access control lists comprise an access control list for the key ladder security component.

2. The method according to claim 1, comprising generating an access control matrix based on the generated access control lists.

3. The method according to claim 2, comprising storing at least a portion of said generated access control matrix in said security processor.

4. The method according to claim 1, wherein the plurality of security components comprises a non-volatile memory security component, and wherein the generated access control lists comprise an access control list for the non-volatile memory security component.

5. The method according to claim 1, wherein the generated set of access rule tables for the key ladder security component and a particular user mode comprises at least a key assignment table, an access control rule table, or a key routing table.

6. The method according to claim 1, wherein the plurality of security components comprises a challenge-response authentication security component, and wherein the generated access control lists comprise an access control list for the challenge-response authentication security component.

7. The method according to claim 6, wherein the generated set of access rule tables for the challenge-response authentication security component and a particular user mode comprises at least a key assignment table, an access control rule table, or a key routing table.

8. The method according to claim 1, wherein the plurality of security components comprises a memory data signature verification security component, and wherein the generated access control lists comprise an access control list for the memory data signature verification security component.

9. The method according to claim 1, wherein the plurality of security components comprises a secure scrambler security component, and wherein the generated access control lists comprise an access control list for the secure scrambler security component.

10. The method according to claim 1, wherein the plurality of security components comprises a security assurance security component, and wherein the generated access control lists comprise an access control list for the security assurance security component.

11. A system, the system comprising:
a security processor that comprises a plurality of security components and an access control matrix, wherein said security processor comprises a plurality of security components, wherein said security processor supports a plurality of user modes, wherein said security processor verifies whether access to at least one of said security components is granted to a particular user mode based on said access control matrix, wherein said access control matrix is based on a plurality of access control lists, wherein each access control list corresponds to a respective security component, wherein at least one of said access control lists is based on respective sets of access rule tables, each set corresponding to a respective security component and respective user mode, wherein said security components comprise a key ladder security component.

12. The system according to claim 11, wherein at least a portion of said access control matrix is implemented in a memory of the security processor.

13. The system according to claim 11, wherein said security processor comprises a processor controller and an internal memory.

14. The system according to claim 11, wherein said security components comprise a non-volatile memory security component.

15. The system according to claim 10, wherein said access control list corresponding to said key ladder component is based on at least a key assignment table, an access control rule table, or a key routing table.

16. The system according to claim 11, wherein said security components comprise a challenge-response authentication security component.

17. The system according to claim 16, wherein said access control list corresponding to said challenge-response authentication component is based on at least a key assignment table, an access control rule table, or a key routing table.

18. The system according to claim 11, wherein said security components comprise a memory data signature verification security component.

19. The system according to claim 11, wherein said security components comprise a secure scrambler security component.

20. The system according to claim 11, wherein said security components comprise a security assurance security component.

* * * * *